(12) United States Patent
Rud et al.

(10) Patent No.: US 8,982,056 B2
(45) Date of Patent: Mar. 17, 2015

(54) SOFTWARE ROTATABLE DISPLAY

(75) Inventors: Jason Harold Rud, Mayer, MN (US); Kristopher Ethan Nordlund, Shakopee, MN (US)

(73) Assignee: Rosemount Inc., Eden Prairie, MN (US)

( * ) Notice: Subject to any disclaimer, the term of this patent is extended or adjusted under 35 U.S.C. 154(b) by 1021 days.

(21) Appl. No.: 13/048,519

(22) Filed: Mar. 15, 2011

(65) Prior Publication Data
US 2012/0236033 A1 Sep. 20, 2012

(51) Int. Cl.
*G09G 5/00* (2006.01)
*G05B 19/042* (2006.01)

(52) U.S. Cl.
CPC ..................................... *G05B 19/042* (2013.01)
USPC ......................................................... 345/169

(58) Field of Classification Search
USPC ................ 345/169, 649; 455/550.1; 382/296; 348/734; 340/815.86
See application file for complete search history.

(56) References Cited

U.S. PATENT DOCUMENTS

| | | | |
|---|---|---|---|
| 6,115,025 A | 9/2000 | Buxton et al. | |
| 6,791,575 B2 | 9/2004 | Abboud | |
| 6,888,537 B2 | 5/2005 | Benson et al. | |
| 7,134,354 B2 | 11/2006 | Nelson et al. | |
| 7,242,385 B2 * | 7/2007 | Kojo | 345/156 |
| 7,256,767 B2 | 8/2007 | Wong et al. | |
| 8,466,774 B2 * | 6/2013 | Lopez et al. | 340/5.61 |
| 8,477,097 B2 * | 7/2013 | Dawson et al. | 345/158 |
| 8,610,830 B2 * | 12/2013 | Corlett et al. | 348/583 |
| 2005/0126305 A1 | 6/2005 | Schulz et al. | |
| 2007/0191970 A1 | 8/2007 | Orth et al. | |
| 2010/0077829 A1 | 4/2010 | Batista et al. | |
| 2011/0057811 A1 | 3/2011 | Hedtke | |

OTHER PUBLICATIONS

The International Search Report and Written Opinion in counterpart PCT Application No. PCT/US2010/029224 filed Mar. 15, 2012.

* cited by examiner

*Primary Examiner* — Abbas Abdulselam
(74) *Attorney, Agent, or Firm* — Kinney & Lange, P.A.

(57) ABSTRACT

An industrial process transmitter includes a transducer positioned to interact with an industrial process, display circuitry that displays a visual output to an operator, and control circuitry. The display can be selectively modified to provide the visual output at one of a plurality of orientations. The control circuitry is connected to communicate with the transducer and the display circuitry and receive an input regarding the orientation of the industrial process transmitter. In response to received input regarding the orientation of the industrial process transmitter, the control circuitry provides instructions to the display circuitry to modify the orientation of the visual output.

21 Claims, 11 Drawing Sheets

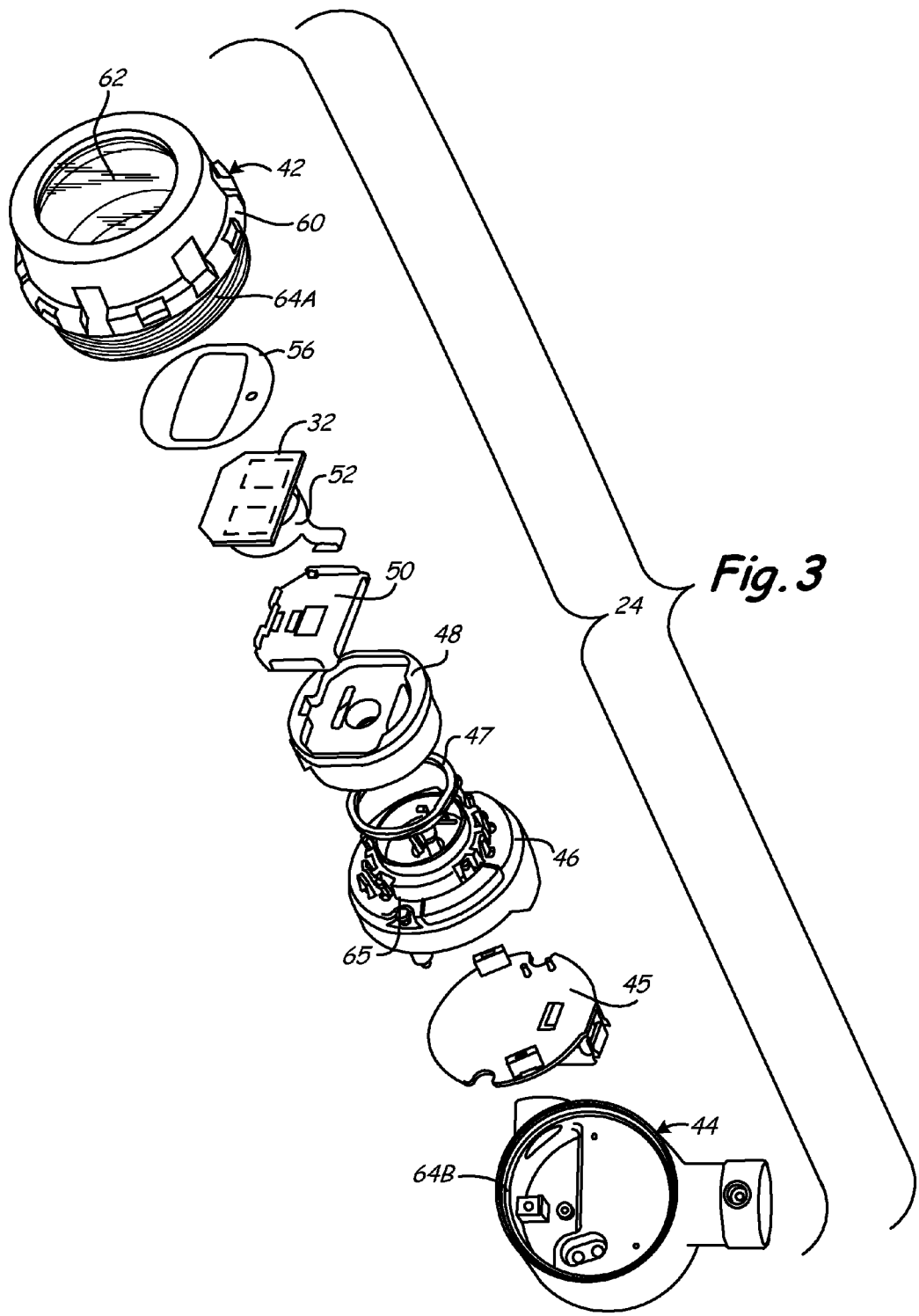

SOFTWARE ROTATABLE DISPLAY

BACKGROUND

The subject matter of the present disclosure relates to an industrial process transmitter, and in particular to an interface that allows an operator to interact with the industrial process transmitter.

Industrial process transmitters are used in industrial process facilities in a variety of settings. For example, industrial process transmitters can include a sensor to sense pressure, temperature, vibration, flow, or nearly any other parameter associated with an industrial process, and/or can include an actuator or other device that manages, controls, or otherwise interacts with an industrial process. The industrial process transmitter can communicate—wirelessly or using a hard-wired connection—with a control room, other device, etc. to help provide industrial process management.

In addition, many industrial process transmitters provide a display (e.g., liquid crystal display (LCD)) and interface (collectively, a local operator interface (LOI)) that allows an operator to interact locally with the industrial process transmitter. The operator may view data or information associated with the transmitter via the LCD screen and may interact or communicate with the transmitter via the LOI.

Due to the various mounting locations and configurations in which an industrial process transmitter may be mounted, the interface provided to an operator may not be oriented in the proper direction for easy readout or interaction. Typically, the orientation of the interface is modified by opening a cover that protects the interface, unscrewing the interface, and re-orienting in the proper direction. However, industrial process transmitters are often installed in hazardous and/or corrosive environments. Removing the cover that protects the interface exposes the interface and interconnection pins that connect the interface to the industrial process transmitter to this potentially damaging environment.

In addition, conventional LOIs associated with industrial process transmitters are implemented with either mechanical switches through transmitter housing, push buttons accessible with the transmitter cover removed, or infrared (IR) transceivers. Removing the covers of transmitters to access push buttons is not ideal since doing so requires a hot permit if the transmitter is in operation. IR transceivers are very current-intensive and are not a good method to use for two-wire process control instruments with very limited current budgets. Additionally, magnetic switches are often used to operate an LOI. However, LOI buttons will not be on or near the LCD screen, thus requiring a user to continually look away from the display while trying to operate the LOI.

SUMMARY

An industrial process transmitter includes a sensor/actuator, display circuitry, local operator interface (LOI) circuitry, and control circuitry. The transducer is positioned to interact with the industrial process. The display circuit displays a visual output to an operator, wherein the display circuitry provides the visual output at one of a plurality of orientations. The LOI circuitry has a plurality of touch-activated buttons for receiving input from an operator, wherein functionality of the plurality of touch-activated buttons is modified based on the orientation of the visual output provided by the display circuitry. The control circuitry is connected to communicate with the sensor/actuator, the display circuitry and the LOI circuitry. The control circuitry provides status/data received from the transducer to the display circuitry for display to the user. The control circuitry also receives input from the operator via the LOI circuitry regarding the desired orientation of the visual output. In response, the control circuitry provides instructions to the display circuitry to modify the orientation of the visual output and modifies the functionality of the LOI circuitry based on the orientation of the visual output.

BRIEF DESCRIPTION OF THE SEVERAL DRAWINGS

FIG. 3 is an exploded perspective view of portions of the industrial process transmitter.

DETAILED DESCRIPTION

Figure 1A:
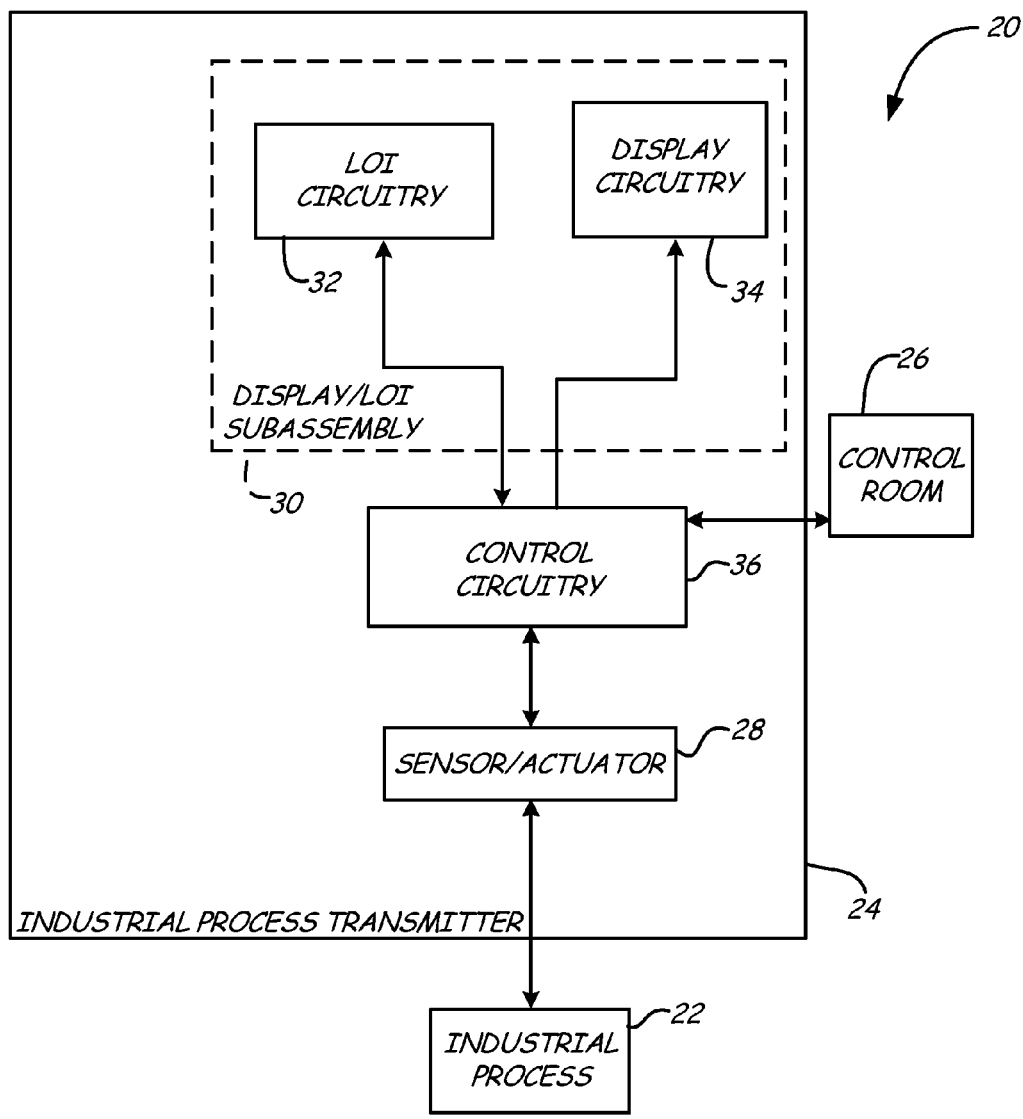
FIGS. 1A-1C are block diagrams illustrating industrial process management systems including an industrial process transmitter according to various embodiments of the present invention.

Industrial process transmitters are often used in environments that expose the transmitters to corrosion, fire, explosion, vibration, and other extreme conditions. For that reason, industrial process transmitters are specially constructed so that they can suitably withstand anticipated operating conditions. For example, an industrial process transmitter that utilizes a display (e.g., LCD) and touch circuitry for implementing a local operator interface (LOI) is described in U.S. patent application Ser. No. 12/807,801, titled "CAPACITIVE TOUCH INTERFACE ASSEMBLY", to Daniel Ronald Schwartz et al., filed on Sep. 14, 2010, and incorporated by reference herein.

In particular, the present invention is an industrial process transmitter that allows the orientation of the display to be modified as necessary based on the mounting orientation of the process transmitter. In addition to modifying the orientation of the display, the LOI interface (e.g., buttons, touch sensors, etc.) that allow a user to interact with the process transmitter is modified based on the orientation of the display. For example, in one embodiment the LOI consists of a plurality of buttons positioned around the periphery of the display. The functionality of the buttons depends on the orientation of the display. For example, a first button may be inactive during a first orientation of the display, but may provide a particular function (e.g., scrolling) in a second orientation of the display. In this way, the present invention acts to preserve the orientation of the touch-actuated buttons with respect to the visual output.

Various combinations of displays and LOIs may be employed in the present invention. In one embodiment of the present invention, the industrial process transmitter can include a housing, an interface subassembly, and a removable cover having a transparent conductor positioned over the local display subassembly. The display/LOI subassembly includes display circuitry for providing a display of visual information and LOI circuitry that includes a capacitive touch circuit for providing touch actuated buttons at or near the displayed visual information through the transparent conductor. The functionality of the touch-activated buttons are modified based on the orientation of the display provided by the display circuit. In one embodiment, the LCD is configured in a chip-on-glass (COG) configuration with the capacitive touch buttons positioned over the digital display, such that capacitive touch actuation can correspond to a variety of different inputs as a function of the particular visual information provided by the display (and visible through the capacitive touch circuit). In other embodiments, the capacitive touch circuit provides one or more active areas (i.e., buttons) positioned generally outside of a display area of the digital display, such as at a periphery of the digital display.

In other embodiments, the LOI subassembly may include a plurality of mechanically-actuated buttons located on the periphery of the display area. Once again, the functionality of the mechanically-activated buttons are modified based on the orientation of the display provided by the display circuit. In other embodiments, various forms of display and LOIs may be employed in which the orientation of the display may be modified and, in turn, the functionality of the buttons associated with the LOI is modified based on the orientation of the display.

Figure 1B:
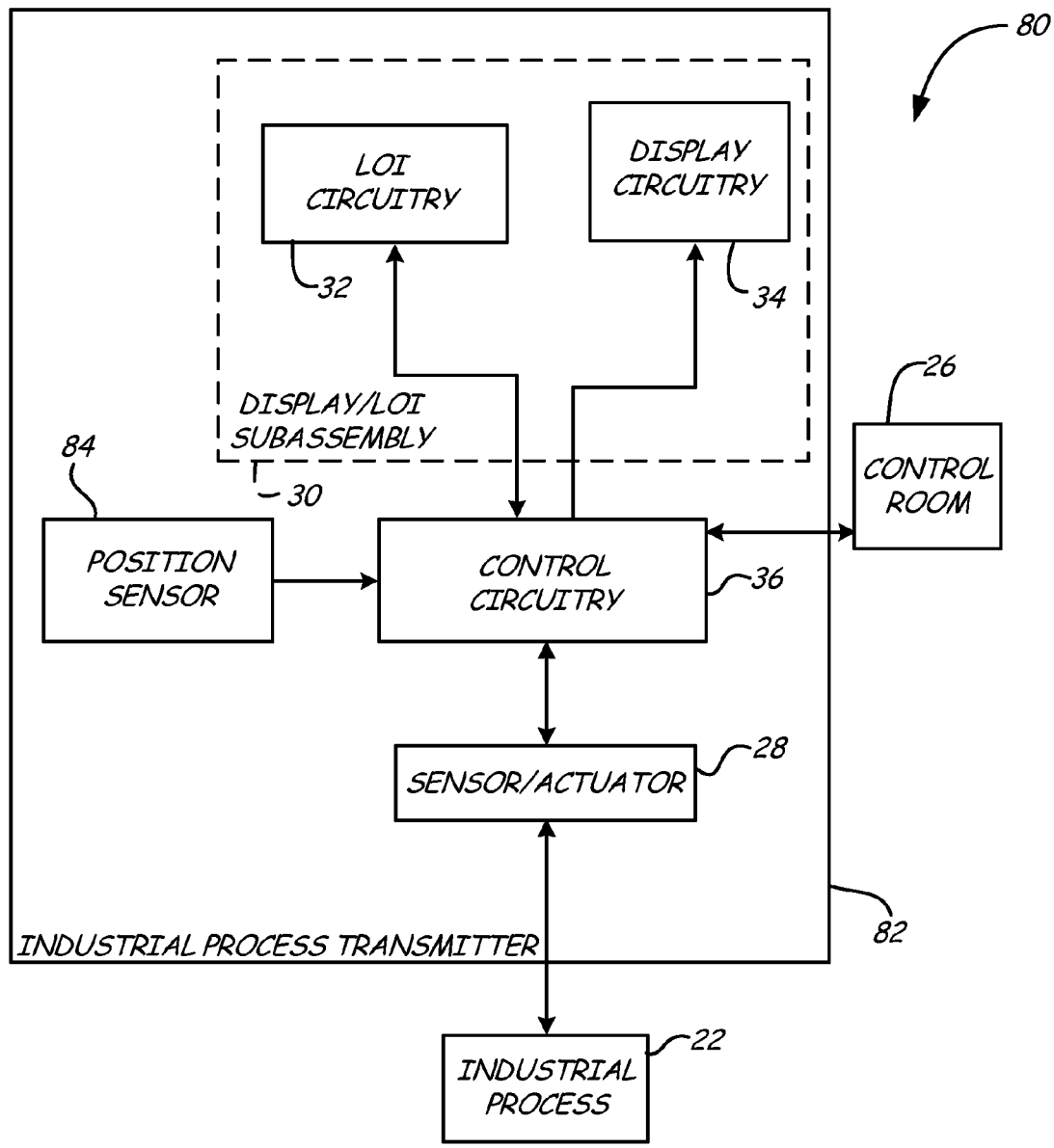
Figure 1C:
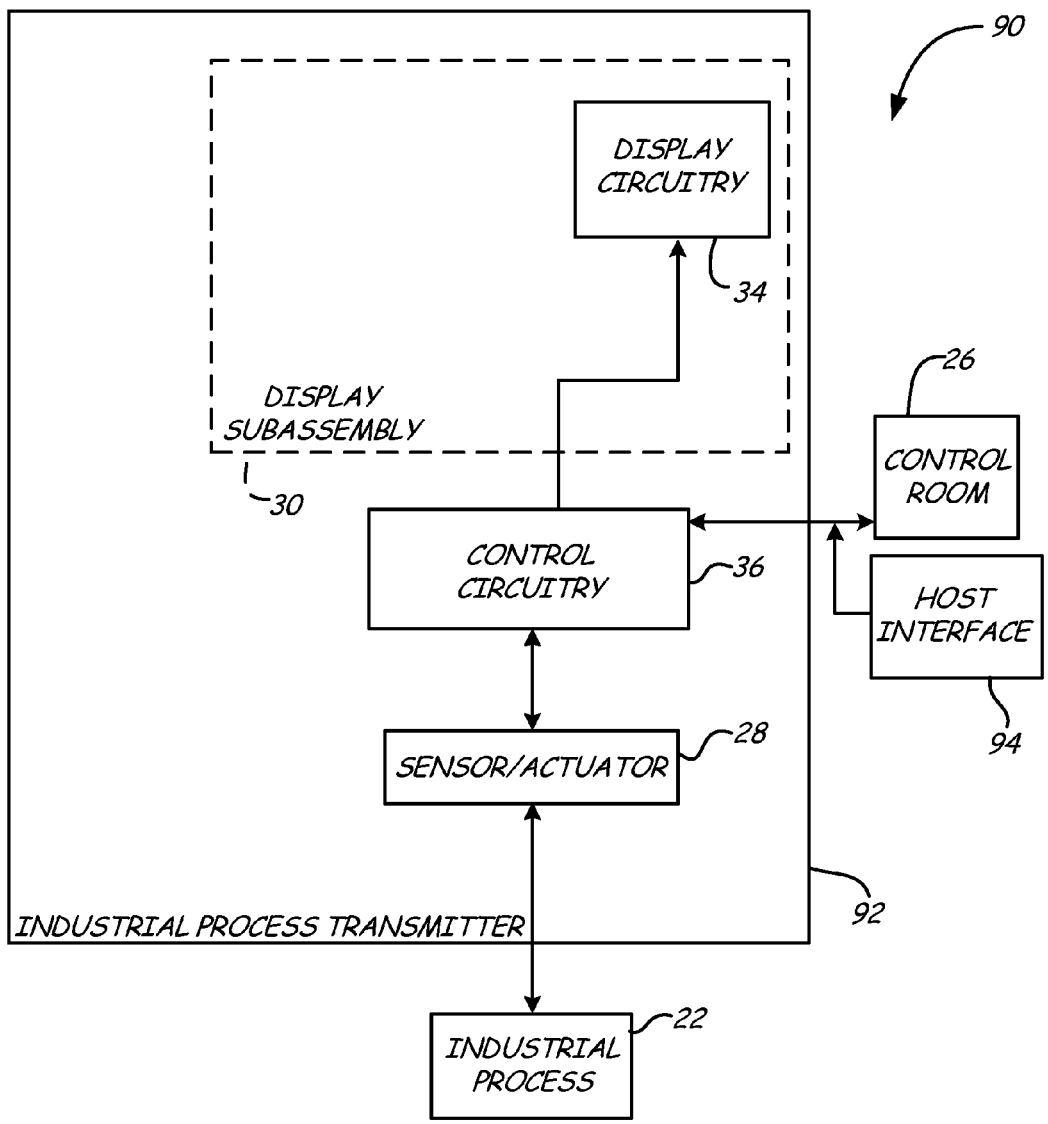

FIGS. 1A-1C are block diagrams illustrating industrial process management systems according to various embodiments of the present invention.

FIG. 1A is a block diagram illustrating an industrial process management system 20 according to an embodiment of the present invention that includes an industrial process 22, an industrial process transmitter 24, and a control room 26. The industrial process transmitter 24 includes a transducer 28, and a display/local operator interface (LOI) subassembly 30, which includes LOI circuitry 32 and display circuitry 34. Control circuitry 36 is also provided to communicate with transducer 28, control room 26, and display/LOI subassembly 30 (including LOI circuitry 32 and display circuitry 34).

The control room 26 can include displays, processors, memory, asset management or control software (e.g., AMS Suite and PlantWeb® software available from Emerson Process Management, Chanhassen, Minn.), and other components for managing and controlling the industrial process 22 and for collecting and analyzing data from the industrial process transmitter 24.

The transducer 28 is positioned to interact with the industrial process 22. In various embodiments the transducer 28 can be configured to sense pressure, temperature, vibration, flow, or nearly any other parameter associated with the industrial process 22 and/or can include an actuator or other device that manages, controls, or otherwise interacts with the industrial process 22. The control circuitry 36 is electrically connected to the transducer 28, and can be of any suitable configuration for controlling operation of the transducer 28, gathering data, processing data, etc. It should be noted that in alternative embodiments the control circuitry 36 can be implemented as a plurality of discrete circuitry subassemblies, and separate control circuitry (not shown) can be provided for the transducer 28.

The display/LOI subassembly 30 includes LOI circuitry 32, which can be of any suitable configuration to enable actuation by an operator, and display circuitry 34, which can be configured as one or more liquid crystal displays (LCDs) with optional backlighting functionality, or as any other type of digital or analog display capable of producing a visual output. In one embodiment, the LOI circuitry 32 is touch activated, wherein LOI circuitry 32 provides one or more touch actuatable regions defined by electrically conductive pads (or buttons) for selectively forming a capacitor with an appendage (e.g., finger) of an operator positioned near any of those regions of the LOI circuitry 32. In that way, the LOI circuitry 32 can provide capacitive touch actuation in a known manner. It will be appreciated that the conductive pads or buttons defining the touch actuatable regions of the LOI circuitry 32 can have any suitable configuration, as desired for particular applications. In one embodiment, the LOI circuitry 32 can have substantially transparent electrical conductors (e.g., formed of indium-tin-oxide material) supported on glass layers with at least a portion of the LOI circuitry 32 positioned over (i.e., on top of) the display circuitry 34, such that the display circuitry 34 is visible through the LOI circuitry 32. This allows the display circuitry 34 to display essentially any information, and for the touch actuatable regions of the LOI circuitry 32 to receive a variety of different inputs correlated to information displayed by the display circuitry 34. In other embodiments, the LOI circuitry 32 includes a plurality of mechanically actuated buttons located outside of the display are (e.g., on the periphery of the display), each button corresponding to various information provided by the display circuitry 34.

In that way, the display/LOI subassembly 30 provides for a dynamic operator interface that can display a variety of information and receive a variety of inputs within a relatively small area. Those of ordinary skill in the art will appreciate that any suitable menu and display layout can be provided by the display/LOI subassembly 30 as desired for particular applications. In alternative embodiments, the LOI circuitry 32 and the display circuitry 34 could be located adjacent to one another or in other arrangements instead of being directly on top of one another.

The control circuitry 36 controls operation of both the LOI circuitry 32 and the display circuitry 34. The control circuitry 36 can include one or more processors of conventional configurations along with software executed by the one or more processors. For example, the control circuitry 36 can control the generation of displays on the display circuitry 34 and the recognition and processing of operator actuation of the touch circuitry 32. In particular, the control circuitry 36 is capable of modifying the orientation of the images displayed by the display circuitry 34 and the functions of the buttons associated with LOI circuitry 32. In this way, the orientation of the display and functionality of the LOI associated with the display can be dynamically modified for the benefit of the operator. Control circuitry 36 is connected to receive input from the operator via LOI circuitry 32, including requests to change the orientation of the display. In response, control circuitry 36 provides orientation instructions to display circuitry 34. Based on the received instructions, the orientation of the display provided by display circuitry 34 is modified. In one embodiment, this includes rotating the display by ninety degree increment. In addition, control circuitry 36 also modifies the functionality of the touch-actuated buttons associated with the LOI circuitry 32 based on the change in orientation of the display. This may include modifying LOI circuitry 32 directly via software located on the LOI circuitry that dictates the functionality associated with each touch-actuated button or by modifying via software located on the control circuitry 36 how inputs provided by the LOI circuitry 32 are interpreted (i.e., the functionality associated with each touch-actuated button). For example, the control circuitry 36 may ignore inputs from a button associated with the LOI circuitry 32 in a first orientation, but may respond to inputs from the same button associated with LOI circuitry 32 in a second orientation. In this way, modifications to the orientation of the display are reflected in the functionality of the LOI interface associated with the display.

The industrial process transmitter 24 can communicate with the control room 26. Communication between the industrial process transmitter 24 and the control room 26 can be through any suitable wireless or hard-wired connection. Moreover, communication with the control room 26 can be direct or through a network of any number of intermediate devices (not shown). The control circuitry 36 can help manage and control communication to and from the industrial process transmitter 24.

FIG. 1B is a block diagram illustrating an industrial process management system 80 according to an embodiment of the present invention that once again includes an industrial process 22, an industrial process transmitter 82, and a control room 26. Industrial process transmitter 82 includes transducer 28, display/LOI subassembly 30, which includes LOI circuitry 32 and display circuitry 34, and control circuitry 36. With respect to the industrial process transmitter described with respect to FIG. 1A, the embodiment shown in FIG. 1B further includes a position sensor 84 (or inclinometer) for detecting the orientation or position of the industrial process transmitter 82. Position sensor or inclinometer 84 may be implemented by a variety of sensor technologies, including through the use of devices such as accelerometers or inertial sensors. Position sensor 84 provides an output to control circuitry 36 indicating or describing the current orientation of the industrial process transmitter 82. In response to the received orientation information, control circuitry 36 automatically configures or updates the orientation of display circuitry 34 and the functionality associated with the touch-actuated buttons associated with LOI circuitry 32. In this way, the embodiment shown in FIG. 1B provides for the automatic re-orientation of the display and LOI functionality of the industrial process transmitter 82.

FIG. 1C is a block diagram illustrating an industrial process management system 90 according to another embodiment of the present invention that includes an industrial process 22, an industrial process transmitter 92, and a control room 26. Industrial process transmitter 92 includes transducer 28, display/LOI subassembly 30, which includes display circuitry 34, and control circuitry 36. Unlike in the embodiments shown in FIGS. 1A and 1B, in the embodiment shown in FIG. 1C the industrial process transmitter 92 does not include a local operator interface (LOI) that allows a user/operator to interact directly with the industrial process transmitter 92. However, it is still desirable to be able to re-orient the display based on the orientation of the industrial process transmitter. In this example, a host interface 94, external to industrial process transmitter 92, is connected to provide inputs to control circuitry 36. In one embodiment, the host interface 94 is a hand-held device that connects to the communication line connected control circuitry 36 and control room 26. Based on commands received from host interface 94, control circuitry 36 acts to change the orientation of display circuitry 34. A host interface such as host interface 94 may be employed in conjunction with industrial process transmitters having a local operator interface, but are particularly beneficial for allowing an operator to interact with those transmitters that do not have a local operator interface. In the embodiment described with respect to FIG. 1C, the host interface 94 is a hand-held device located separately from the control room 26, but in other embodiments, the control room 26 may operate as the host interface, issuing commands that dictate the orientation of the display provided by display circuitry 34.

The industrial process transmitters described with respect to FIGS. 1A-1C may include additional components not specifically shown in these figures. Moreover, it will be appreciated that the particular configuration of the industrial process transmitter may vary as desired depending on the application.

Figure 2A:
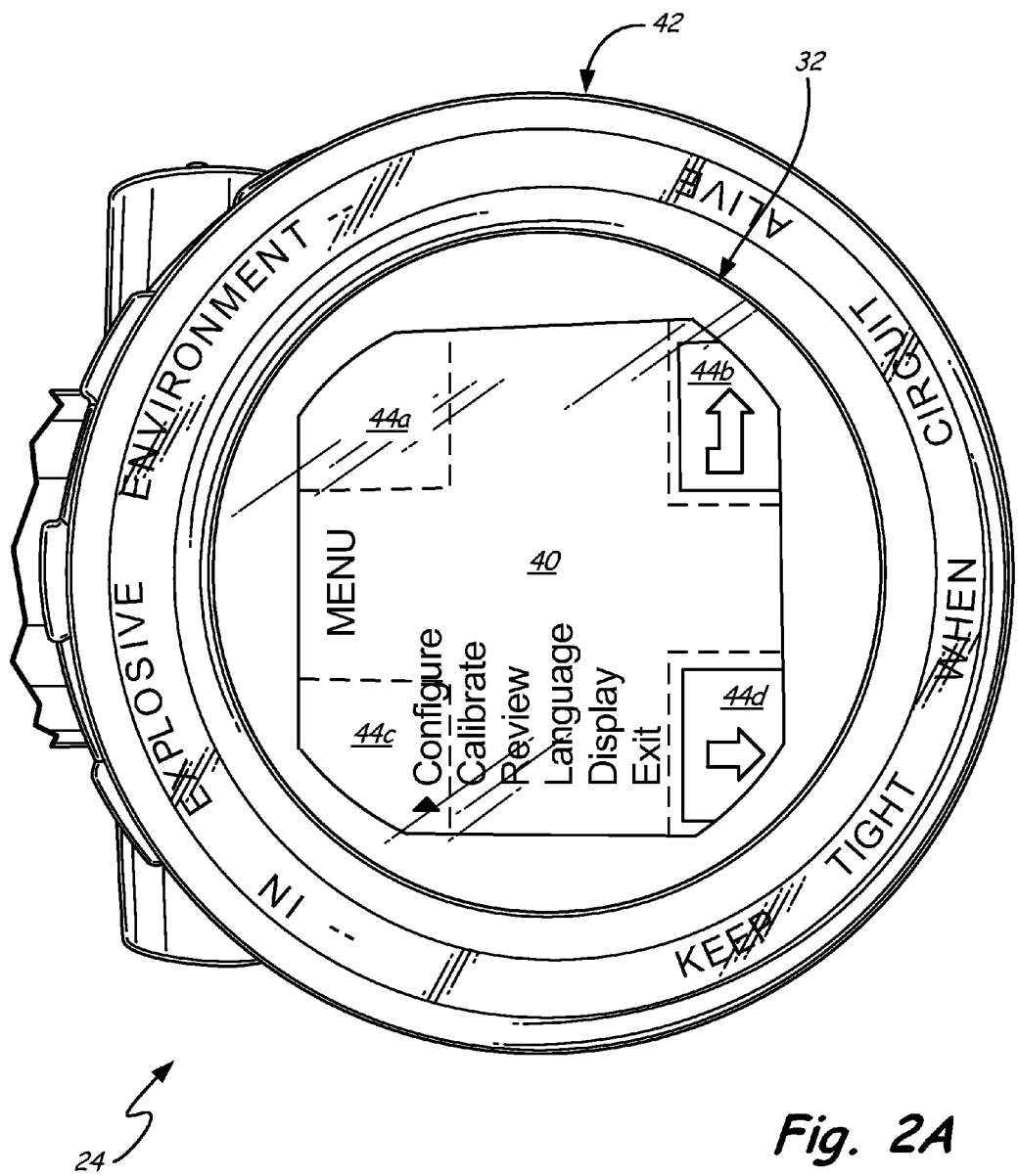
FIGS. 2A-2E are front views of the industrial process transmitter illustrating the display presented to an operator during operation.
Figure 2B:
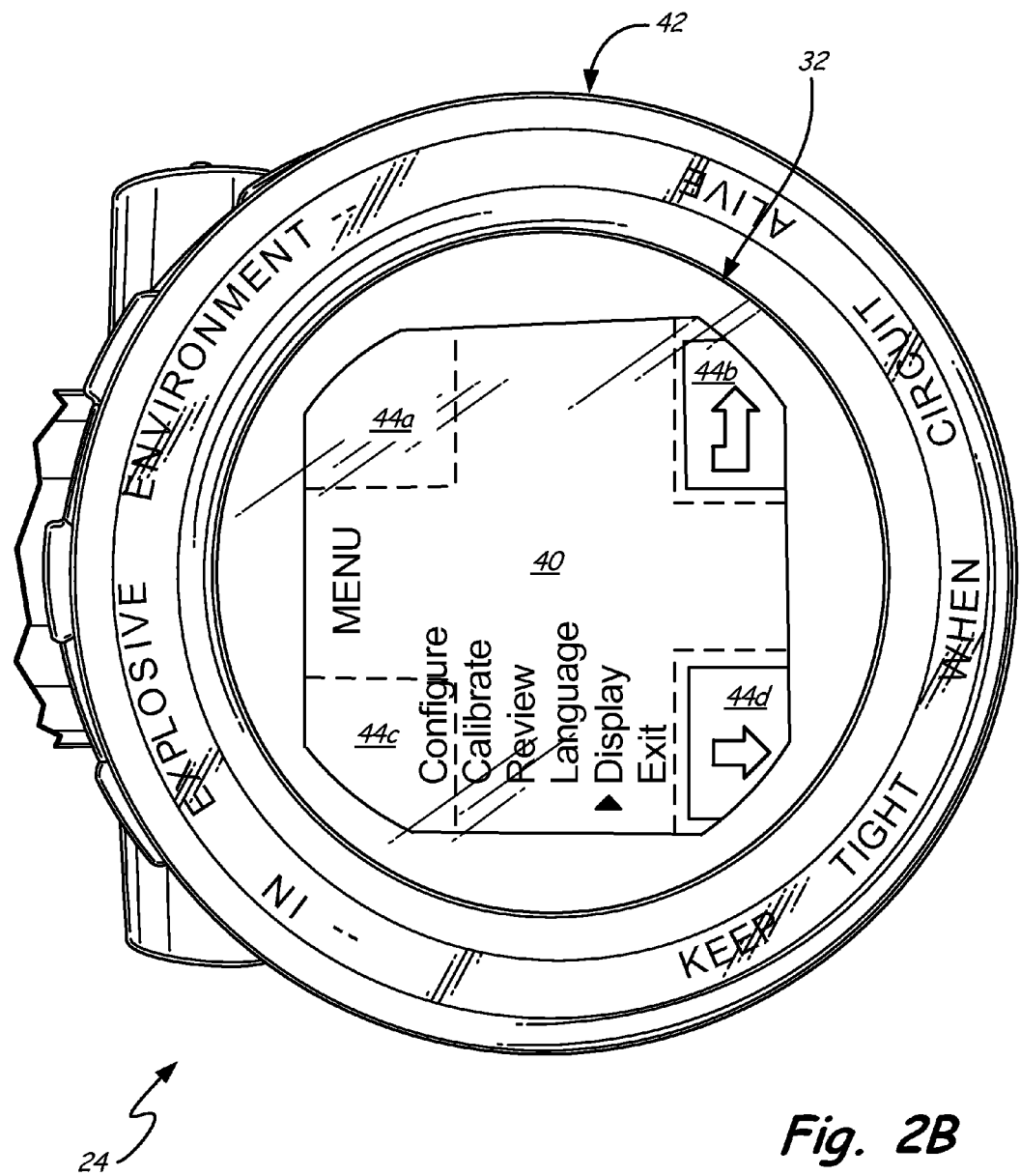
Figure 2C:
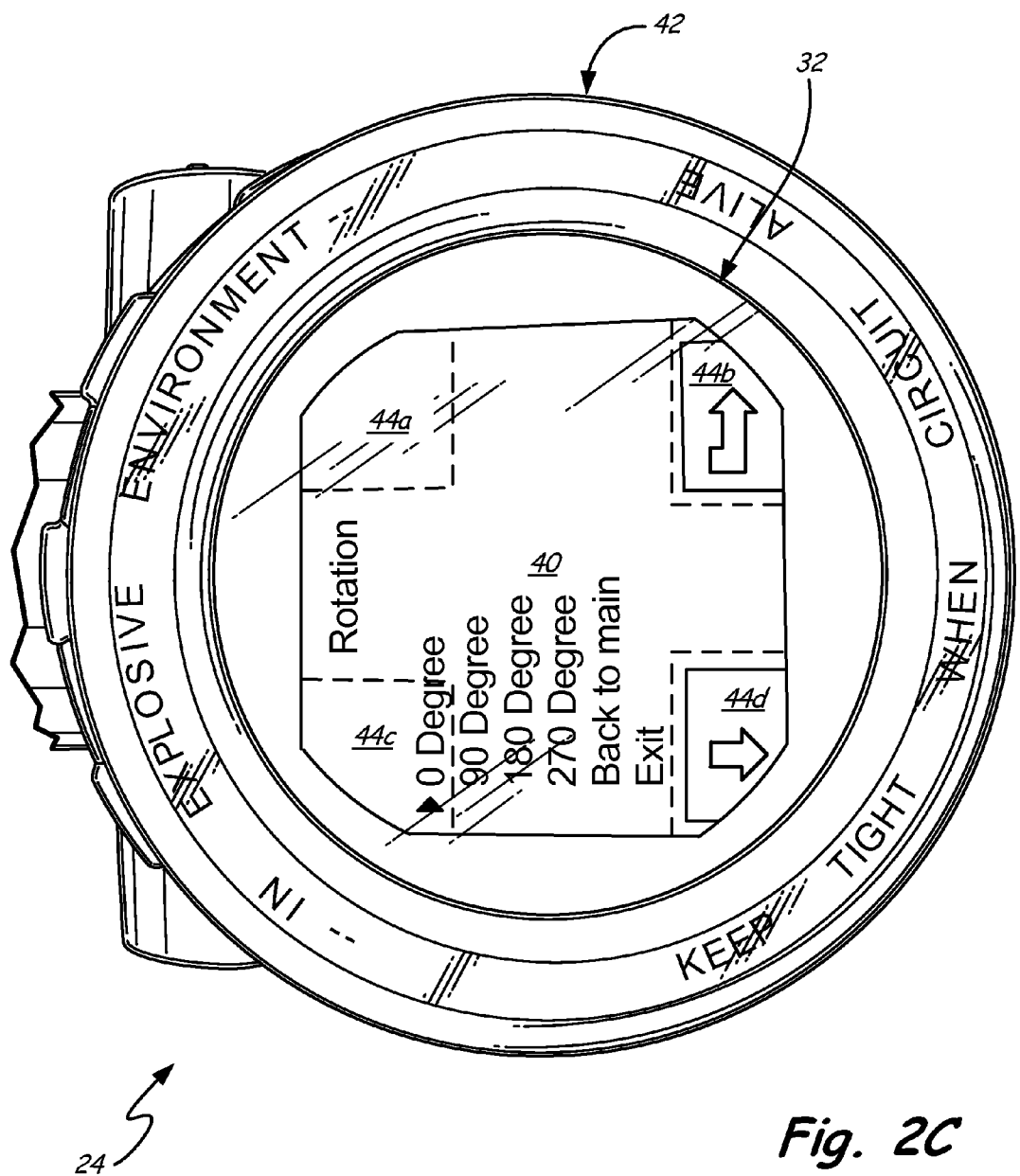
Figure 2D:
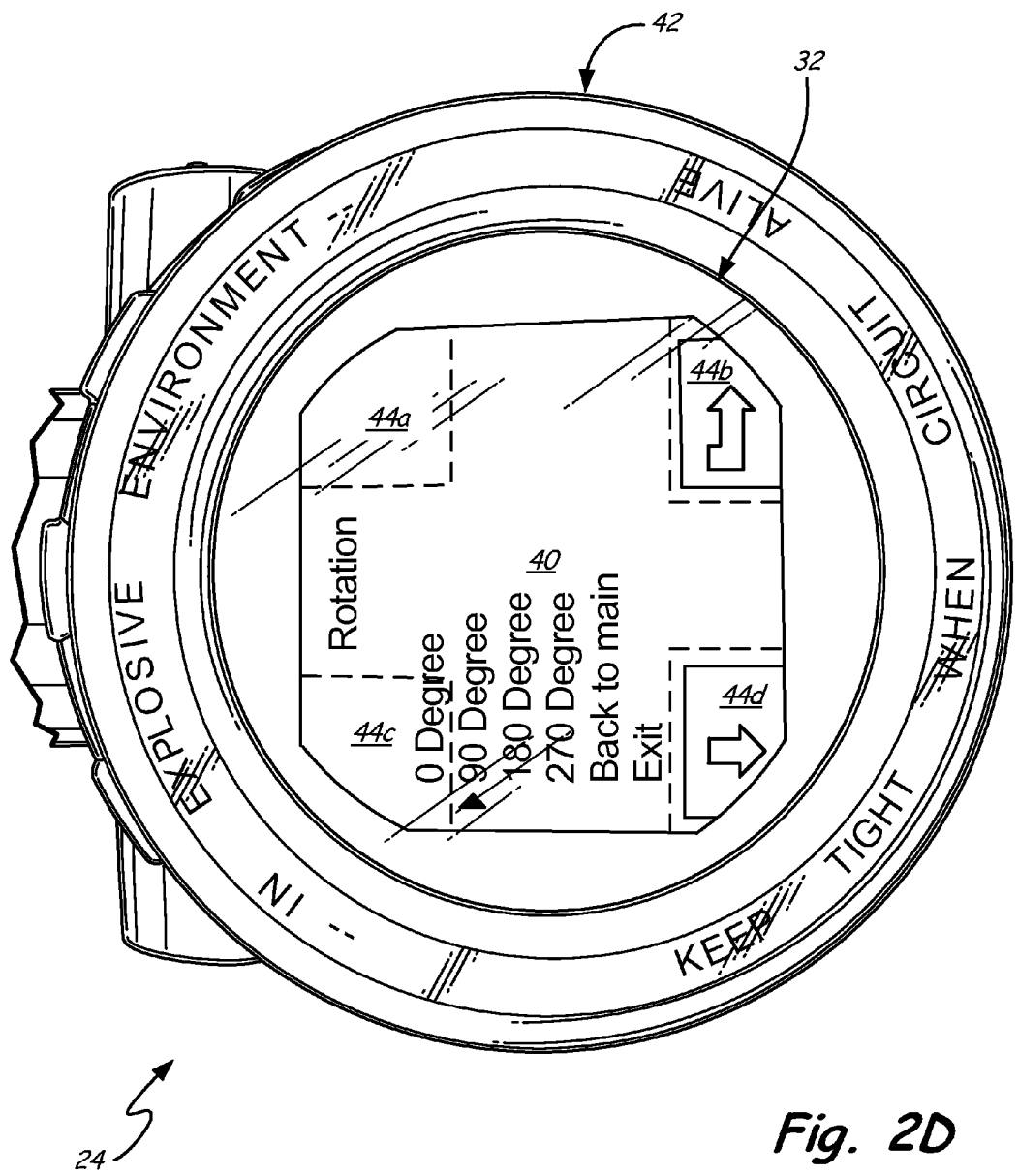
Figure 2E:
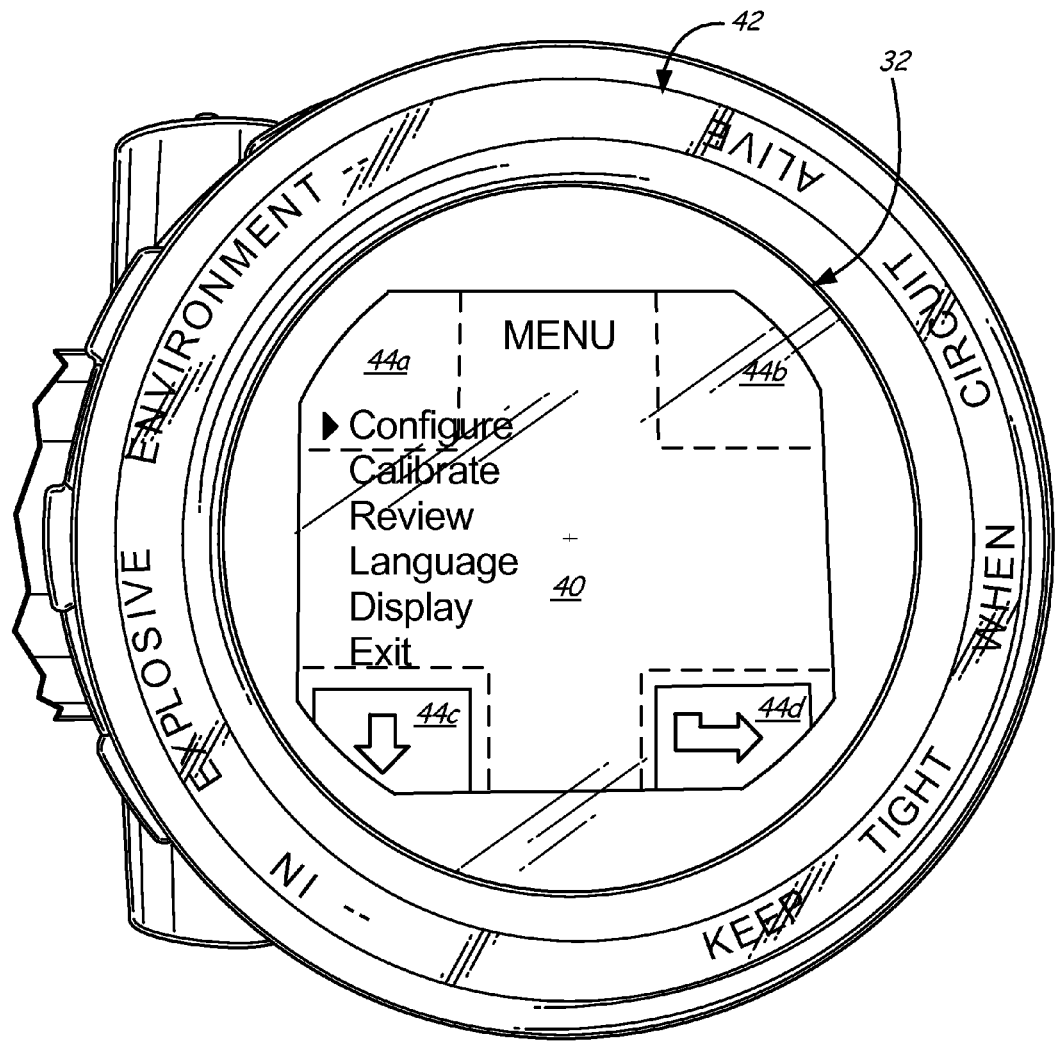

FIGS. 2A-2E are front views of the industrial process transmitter 24 according to an embodiment of the present invention that illustrates the display/LOI provided to an operator during operation. In FIGS. 2A-2D, the orientation of the display makes it difficult for an operator to interact with the display/LOI. In FIG. 2E, the orientation of the display has been modified, without modifying the mounting orientation of industrial process transmitter 24, to improve operator interaction with the display/LOI.

In the embodiment shown in FIGS. 2A-2E, display circuitry 34 (shown in FIG. 1A) employs liquid-crystal display (LCD) having a viewing area 40 visible through a transparent cover piece (not shown). The display circuitry 34 provides a menu display with scrollable categories that include 'Configure', 'Calibrate', 'Review', 'Language', 'Display', and 'Exit'. The display circuitry 34 also provides labels identifying the functions of the various LOI buttons provided by the LOI circuitry 32 (shown in FIG. 1A). In this embodiment, the LOI circuitry 32 provides four capacitive touch-actuated buttons labeled 44a, 44b, 44c and 44d, the locations of which are shown by the dashed outlines at each corner of the viewing area 40. In this embodiment, the viewing area 40 of the display is visible over the touch-actuated buttons 44a-44d, and the display is used to convey the function performed by each button 44a-44d. For example, in FIG. 2A an arrow pointing down (according to the display orientation) is provided over touch-actuated button 44a, indicating that this button can be used to scroll down through the menu options. An 'L' shaped arrow is displayed over touch-actuated button 44c, indicating that this button can be used to select a particular menu category.

The operator interacts with the display and LOI interface to selectively modify the orientation of the display. In the embodiment shown in FIGS. 2A-2E, the operator uses touch-actuated button 44d to scroll down to the menu option labeled 'Display' as shown in FIG. 2B. The operator uses touch-actuated button 44b to select the menu option 'Display'. As shown in FIG. 2C, in response to the user selecting the 'Display' menu option, the display provides a screen with options regarding the orientation of the display relative to the current orientation (or initial orientation), labeled '0 Degree', '90 Degree', '180 Degree', '270 Degree', 'Back to main' and 'Exit'. The operator once again uses the touch-actuated button 44d to scroll through the menu options. As shown in FIG. 2D, the user scrolls down to the orientation labeled '90 Degree' and uses touch-actuated button 44b to select the desired orientation.

In response to a user selection of an orientation, the selected orientation is communicated from the LOI circuitry 32 to the control circuitry 36 (as shown in FIG. 1A). Based on the selected orientation, the control circuitry 36 communicates instructions to the display circuitry 34 causing the display circuitry 34 to provide the desired orientation. As a result, display circuitry 34 causes the display to be re-oriented by the desired amount as shown in FIG. 2E. In the embodiment shown in FIGS. 2A-2E, this includes re-orienting the portion of the display 40 that describes the functionality of the touch-actuated buttons 44a-44d. For example, in the embodiment shown in FIG. 2E, the portion of the display 40 with the arrow pointing down is now located over touch-actuated button 44c and the 'L'-shaped arrow is located over touch-actuated button 44d. In response, control circuitry 36 modifies the functionality associated with each touch-actuated button 44a-44d. For example, the functionality associated with touch-activated button 44c is now associated with the scroll feature of the display. Likewise, the functionality associated with touch-activated button 44d is now associated with the select feature of the display, and touch-activated buttons 44*a* and 44*b* are not associated with any functionality. Changing the functionality associated with each of the buttons may be done by modifying the operation associated with control circuitry 36 (e.g., modifying via software on control circuitry 36 how inputs received from the LOI circuitry 32 are interpreted) or by modifying the operation of LOI circuitry 32.

Figure 4:
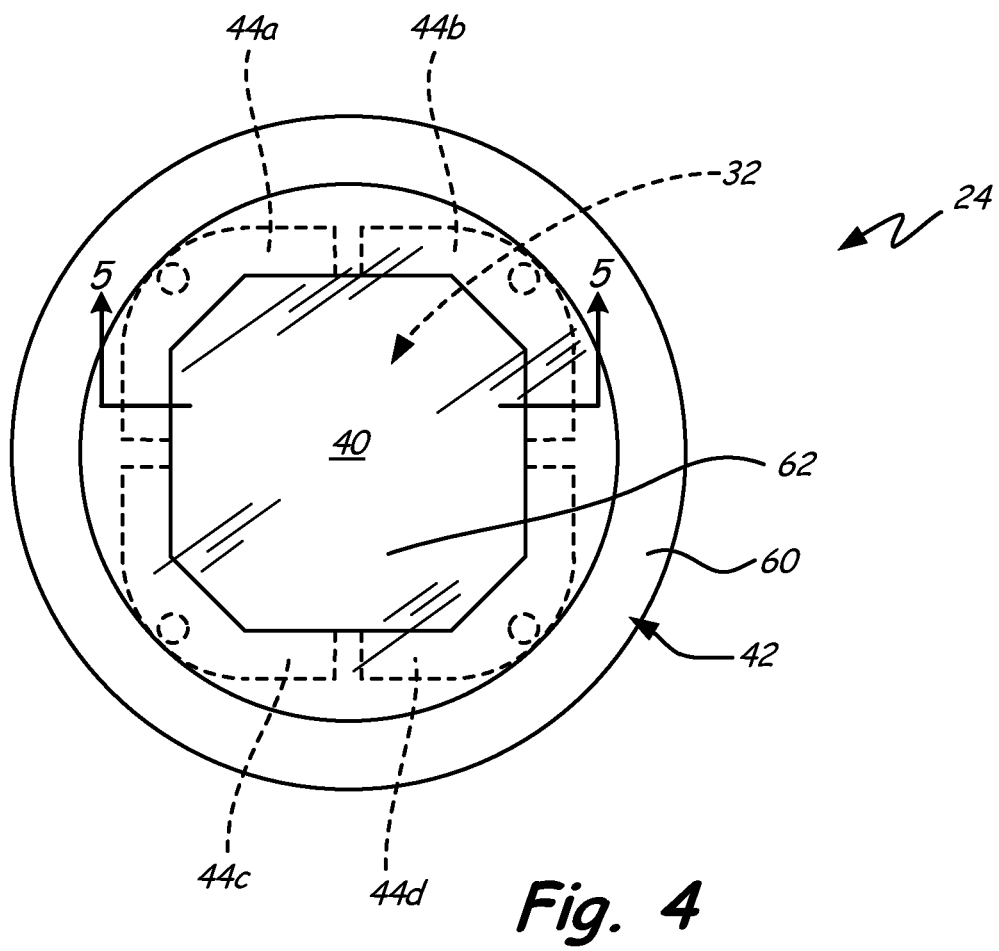
FIG. 4 is a plan view of a portion of an industrial process transmitter, showing an embodiment of a local operator interface (LOI) subassembly.
Figure 5:
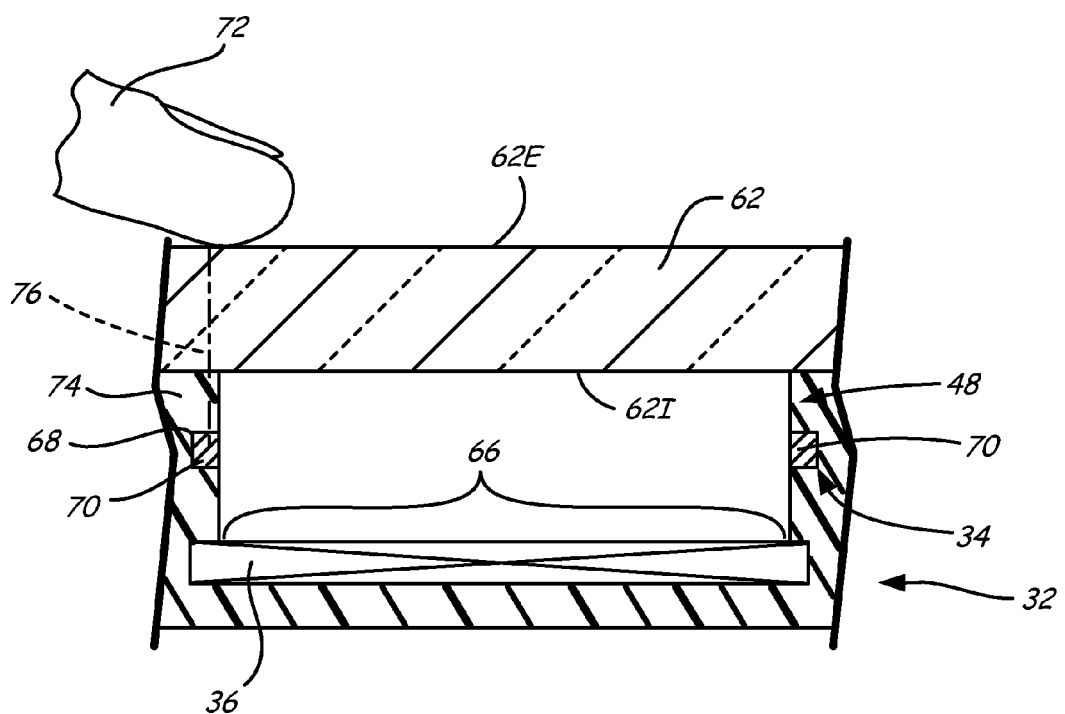
FIG. 5 is a cross-sectional view of the LOI subassembly of FIG. 4, taken along line 5-5 of FIG. 4.

FIGS. 3-5 illustrate an industrial process transmitter according to one embodiment of the present invention in which the LOI circuitry 32 is implemented with capacitive touch-actuated sensors. FIG. 3 is an exploded perspective view of portions of one embodiment of the industrial process transmitter 24 that employs touch activated LOI circuitry via a capacitive touch sensor. As shown in FIG. 3, the industrial process transmitter 24 includes a cover 42 (also shown in FIGS. 2A-2E), housing 44, an electronics board 45, an electronics board shroud 46, a biasing member 47, a display shroud 48, a carrier 50, a flex circuit 52, a display/LOI subassembly 30, a label 56, and a cover 58.

The housing 44 can have a generally cylindrical shape. The housing can be made of any suitable materials, such as metallic or polymer materials. Known manufacturing processes can be used to make the housing 44, such as casting, machining and molding processes, or any other suitable manufacturing processes. The cover 42 includes a cover chassis 60 and a transparent cover piece 62. The cover chassis 60 can be made of a metallic material, a polymer material or other suitable material, and has a generally cylindrical shape. The transparent cover piece 62 is fixed to the cover chassis 60, and can be made of glass that is approximately 10 mm or more thick. Threads 64A are formed on the cover chassis 60 for threadably engaging the cover 58 to the housing 44 at corresponding housing threads 64B. Suitable seals (e.g., o-rings, gaskets, etc.) (not shown) can be provided for sealing the industrial process transmitter 24 from an exterior environment when the cover 58 is engaged to the housing 44. In the illustrated embodiment, the cover 58 and the housing, when engaged together, provide a sealed, fire-proof, and explosion-proof enclosure for the industrial process transmitter 24.

In general, the display/LOI subassembly 30 is supported by the carrier 50, which is in turn attached to the display shroud 48. The display/LOI subassembly 30 incorporates the LOI circuitry 32 and the display circuitry 34, which can each be provided on a suitable number of glass layers. The carrier 50 can be molded from a polymer material, and provides a support structure to simplify handling of the display/LOI subassembly 30 during assembly of the industrial process transmitter 24. The label 56 is affixed over the display/LOI subassembly 30 at a side arranged to face the transparent cover piece 62, and can provide desired visual indications (such as button locations, etc., if such visual indications are not provided by the display). The biasing member 47 can be a spring or collection of springs, such as a wave spring (e.g., having a load of approximately 89 newtons (20 lb.) at a working height of approximately 5.1 mm (0.2 inch)), and is operatively engaged between the display shroud 48 and the electronics board shroud 46. The electronics board 45 contains the control circuitry 36 (shown in FIG. 1A), which can include a processor and any other desired electrical components of known configurations, and as mechanically secured to the electronics board shroud 46. The electronics board shroud 46 is secured with suitable fasteners 65 (e.g., bolts, screws, etc.) to the housing 44.

The electronics board 45 is electrically connected to the display/LOI subassembly 30 by the flex circuit 52, which extends through the carrier 50, the display shroud 48 and the electronics board shroud 46. Although in the illustrated embodiment the flex circuit 52 is configured to have electrical traces printed on a flexible dielectric substrate, it should be understood that the flex circuit 52 can have any suitable configuration in alternative embodiments, such as a group of discrete wires, etc. At least a portion of the flex circuit 52 can be arranged in a coil shape, thereby permitting rotation of the display shroud 48 relative to the electronics board shroud 46 while maintaining electrical connections. The flex circuit 52 can be electrically connected to the display/LOI subassembly 30 with a hot bar anisotropic glue connection, and the flex circuit 52 can further be electrically connected to the electronics board 45. In order to reduce stress on electric connections to the flex circuit 52, the flex circuit 52 can be mechanically secured to display/LOI subassembly 30 components, such as by being threaded through slots on the carrier 50 or being glued to the carrier 50. The electronics board 45 is further electrically connected to additional circuitry (not shown) located inside the housing 44.

FIG. 4 is a plan view of a portion of an industrial process transmitter 24, showing a cover 42 that includes a cover chassis 60 and a transparent cover piece 62 and an embodiment of the display/LOI subassembly 30. The cover 42 can have a configuration similar to previously described embodiments. FIG. 5 is a cross-sectional view of the display/LOI subassembly 30 and a portion of the transparent cover piece 62, taken along line 5-5 of FIG. 4. In the illustrated embodiment, the LOI circuitry 32 employed by display/LOI subassembly 30 includes a plurality of cavities 68 formed in the display shroud 48 and capacitive touch buttons 70 defined within cavities 68 with the display shroud 48 having contact structure 74. Display circuitry 34 (shown only schematically in FIG. 5 for simplicity) is mounted on and supported by the display shroud 48, and defines a viewing area 66. In the illustrated embodiment, the viewing area 66 is an octagonal region at a central portion of the display circuitry 34 that is capable of producing a digital display. In further embodiments, the viewing area 66 can have nearly any configuration as desired for particular applications. The display circuitry 34 can incorporate one or more LCD screens, or other suitable display. Electrical connections to the display circuitry 34, while not shown in FIGS. 4 and 5, can be made in any suitable manner.

The contact structure 74 in the illustrated embodiment is positioned at or near a periphery of the display circuitry 34, and, more particularly, outwardly adjacent to a perimeter of the viewing area 66 of the display circuitry 34. In the illustrated embodiment, the contact structure 74 is a continuous ridge with a generally annular shape and has a central opening that allows the viewing area 66 of the display circuitry 34 to be visible through the transparent cover piece 62. In other embodiments the contact structure 74 can be discontinuous, and have nearly any suitable configuration. The transparent cover piece 62 defines an exterior surface 62E and an opposite interior surface 62I. The contact structure 74 is positioned to physically contact the interior surface 62I of the transparent cover piece 62. A biasing member can be used to urge the contact structure 74 of the display shroud 48 against the transparent cover piece 62. Alternatively, the contact structure 74 can be positioned in contact with the transparent cover piece 62 by any other suitable means. The display shroud, including the contact structure 74, can be made of a suitable polymer material or a relatively low dielectric material.

One or more cavities 68 are formed in the display shroud 48. In the illustrated embodiment, four generally equally spaced cavities 68 are formed along an interior side of the contact structure 74. In alternative embodiments, the cavities 68 could be located at an exterior side of the contact structure 74, could extend all the way between the interior and exterior sides of the contact structure, could be unequally spaced, or otherwise vary from the illustrated configuration. Positioned at least partially within each of the cavities 68 is the capacitive touch button 70. The buttons 70 are thereby embedded in the display shroud 48 to form touch-sensitive regions of the touch circuitry 32, to allow for capacitive touch actuation by a user or operator. In that respect, the buttons 70 would generally not be visible through the transparent cover piece 62 but instead would be hidden by material of the display shroud 48. The buttons 70 can have any suitable shape desired for a particular application. The buttons 70 can be layers of metallic material, and can be fabricated in any suitable manner. For example, the buttons 70 can be formed as stamped metal pieces that are inserted into the cavities 68 or overmolded with material of the display shroud 48 to simultaneously define cavities 68, or can be made as metallic material sputtered onto the material of the display shroud 48. Spacing between the buttons 70 and the transparent cover piece 62 can be less than or equal to approximately 0.0254 mm (0.001 inch) in some embodiments.

A capacitive touch electrostatic field path 76 can be formed between a user's finger 72 at the exterior surface 62E of the transparent cover piece 62 and any of the buttons 70. In the illustrated embodiment, the field path 76 can extend substantially linearly from a user's appendage 72 through the transparent cover piece 62 and through at least a portion of the display shroud 48 (e.g., though a portion of the contact member 74) to a selected one of the buttons 70. The field path 76 between the exterior surface 62E of the transparent cover piece 62 and the selected button 70 generally passes only through solid material, and, more particularly, does not have to cross an air gap that would otherwise tend to decrease capacitive touch sensitivity. Thus, in the illustrated embodiment of FIGS. 4 and 5 and air gap can be eliminated entirely. Moreover, because the buttons 70 can be positioned at the periphery of the display circuitry 34, there is no need for the touch circuitry to be transparent or to be located on a glass supporting structure, which can help facilitate and simplify manufacture.

An industrial process transmitter has been described that provides a display and a local operator interface to facilitate communication with an operator. To prevent the operator from having to unscrew the cover associated with the industrial process transmitter to change the orientation of the display, the transmitter described herein allows the operator to modify the orientation. The modification is performed in software, thereby allowing the operator to change the orientation without having to disassemble the transmitter. In addition, the industrial process transmitter allows the function of the LOI to be modified based on the modifications made to the orientation of the display.

While the invention has been described with reference to the exemplary embodiments, it will be understood by those skilled in the art that various changes can be made, and equivalents can be substituted for elements thereof without departing from the scope or spirit of the invention. In addition, many modifications can be made to adapt a particular situation or material to the teachings of the invention without departing from the essential scope thereof. Therefore, it is intended that the invention not be limited to the particular embodiments disclosed, but that the invention include all embodiments falling within the scope of the appended claims.

What is claimed is:

1. An industrial process transmitter comprising:
    a housing configured to be mounted in a fixed orientation;
    a transducer positioned to interact with an industrial process;
    a display device fixedly mounted within the housing, the display device having four corner regions arranged about a periphery of a viewing region of the display device;
    display circuitry that displays a visual output at the display device, wherein the display circuitry provides the visual output at one of a plurality of visual output orientations;
    local operator interface (LOI) circuitry having a plurality of buttons for receiving input, including input regarding a desired orientation of the visual output, wherein each of the plurality of buttons is disposed at a different one of the four corner regions of the display device; and
    control circuitry connected to communicate with the transducer, the LOI circuitry, and the display circuitry and receive input regarding the desired orientation of the visual output, wherein in response to the received input regarding the desired orientation of the visual output via one or more of the plurality of buttons, the control circuitry provides instructions to the display circuitry to modify the orientation of the visual output and modifies functionality of the plurality of buttons based on the orientation of the visual output.

2. The industrial process transmitter of claim 1, wherein the control circuitry modifies the functionality of the plurality of buttons by modifying how the control circuitry interprets inputs received from each of the plurality of buttons.

3. The industrial process transmitter of claim 1, wherein the control circuitry modifies the functionality of the plurality of buttons by providing instructions to the LOI circuitry regarding the functionality to be associated with each of the plurality of buttons.

4. The industrial process transmitter of claim 1, wherein the plurality of buttons are touch-activated buttons.

5. The industrial process transmitter of claim 1, wherein the plurality of buttons are mechanically-activated buttons.

6. The industrial process transmitter of claim 1, wherein the display circuitry displays in the visual output a menu of possible orientations from which to select.

7. The industrial process transmitter of claim 1, further including:
    a position sensor that detects the position of the industrial process transmitter and communicates as an input to the control circuitry the sensed position of the industrial process transmitter.

8. The industrial process transmitter of claim 1, wherein the control circuitry receives input from a host interface located external to the industrial process transmitter, the host interface communicating instructions regarding the desired orientation of the visual output.

9. The industrial process transmitter of claim 8, wherein the host interface is a hand-held device operated by a user.

10. A method of modifying the orientation of a visual output provided by an industrial process transmitter at one of a plurality of visual output orientations, the method comprising:
    receiving via local operator interface (LOI) circuitry having a plurality of buttons a request to modify the orientation of the visual output of the industrial process transmitter;
    communicating the request to display circuitry, which modifies the orientation of the visual output based on the received request, the visual output displayed at a display device fixedly mounted within a housing that is mounted in a fixed orientation, wherein the display device has four corner regions arranged about a periphery of a viewing region of the display device, wherein each of the plurality of buttons is disposed at a different one of the four corner regions; and modifying functionality of the plurality of buttons based on the modified orientation of the visual output.

11. The method of claim 10, wherein the plurality of orientations of the visual output are distinguishable by 90-degree rotatable increments.

12. The method of claim 10, wherein the plurality of orientations of the visual output are distinguishable by 45-degree rotatable increments.

13. The method of claim 10, further including:
displaying via the visual output a menu of possible orientations from which to select.

14. An industrial process transmitter having a local operator interface (LOI) that allows an operator to interact with the industrial process transmitter, the industrial process transmitter comprising:
a housing configured to be mounted in a fixed orientation;
a display device fixedly mounted within the housing, the display device having four corner regions arranged about a periphery of a viewing region of the display device;
display circuitry for providing a visual output at the display device in one of a plurality of visual output orientations;
local operator interface (LOI) circuitry having a plurality of touch-actuated buttons having functions that correspond with the visual output provided by the display circuitry, each of the plurality of touch-actuated buttons disposed at a different one of the four corner regions of the display device; and
control circuitry for modifying the orientation of the visual output and modifying the functions of the plurality of buttons to preserve an orientation of the touch-actuated buttons with respect to the visual output.

15. The industrial process transmitter of claim 14, wherein the display circuitry provides as part of the visual output a menu of possible orientations from which to select.

16. The industrial process transmitter of claim 15, wherein in response to inputs received from an operator via the plurality of buttons the LOI circuitry selects the orientation of the visual output provided by the display circuitry.

17. The industrial process transmitter of claim 14, wherein the control circuitry modifies via software how inputs received from the LOI circuitry are interpreted to preserve the orientation of the buttons with respect to the visual output.

18. The industrial process transmitter of claim 14, wherein the control circuitry provides instructions to the LOI circuitry with respect to the functions to be associated with each of the plurality of buttons to preserve the orientation of the touch-actuated buttons with respect to the visual output.

19. The industrial process transmitter of claim 14, further including:
a position sensor that detects the position of the industrial process transmitter and communicates the sensed position to the control circuitry to provide automatic re-orientation of the visual output and modification of the LOI circuitry.

20. The industrial process transmitter of claim 14, wherein the control circuitry is operably connected to a host interface for selecting a desired orientation of the visual output.

21. The industrial process transmitter of claim 20, wherein the host interface is a hand-held device.

* * * * *